Patented Sept. 14, 1948

2,449,440

UNITED STATES PATENT OFFICE 2,449,440

ARYL ESTERS OF TERTIARY CARBAMIC ACID

John A. Aeschlimann, Montclair, N. J., assignor to Hoffmann-La Roche Inc., Nutley, N. J., a corporation of New Jersey No Drawing. Application June 25, 1946,
Serial No. 679,266

11 Claims. (Cl. 260—471)

This invention relates to compounds of the carbamic ester type and more particularly to substituted-aryl carbamic esters of phenolic bases and to their method of manufacture. The invention also relates to novel intermediates from which such carbamic esters are produced, as well as to the process for preparing the intermediates.

The new carbamic esters comprising my invention can be represented by the general formula:

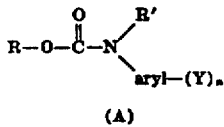

(A)

In the above formula R represents a phenyl radical substituted by a nitrogen-containing group which can be in the form of a tertiary amine, or its salts. It is to be understood that the phenyl radical R may contain other substituents in addition to the basic group, such as alkyl, aryl, branched alkyl or alkoxy, or aryloxy groups. R' represents a lower alkyl, aralkyl or aryl group as, for example, methyl, ethyl, propyl, butyl, benzyl or phenyl. Y represents a halogen as, for example, chlorine or bromine; a lower alkyl radical, as for instance, methyl, ethyl, propyl; an alkoxy group as, for example, methoxy, ethoxy or propyloxy. $n$ represents a small whole number from 1 to 5. Where $n$ is more than 1, the substituents represented by Y can be the same or different as, for example, alkyl and halogen, alkyl and alkoxy, alkoxy and halogen, or all three types of groups may be present.

The compounds as represented by the Formula A have been found to possess valuable therapeutic properties. Thus, the 3-(methyl-para-substituted aryl carbamoxy)phenyl-trimethylammonium salts inhibit cholinesterase more strongly than the unsubstituted 3-(phenyl methylcarbamoxy)-phenyl-trimethylammonium salts. These novel compounds exhibit a more powerful pharmacological action than physostigmine and the carbamic esters disclosed in my U. S. Patents No. 1,905,990 and 2,208,485. The curare-like action on frog's rectus exerted by other compounds of the general formula, such as the 1,2,3-xylenyl analog which has a definite curarizing action, is surprising because the unsubstituted 3-(phenyl methylcarbamoxy)phenyl-trimethylammonium salt acts as an antagonist to curare according to Briscoe (Lancet 232, 621, 1937). Such compounds can be utilized in the treatment of spastic conditions.

The substituted-aryl carbamic esters of phenolic bases can be readily prepared by reacting the corresponding substituted-aryl carbamyl halides with the free basic phenol or the basic metal phenolate. The reaction can be illustrated by the following equation:

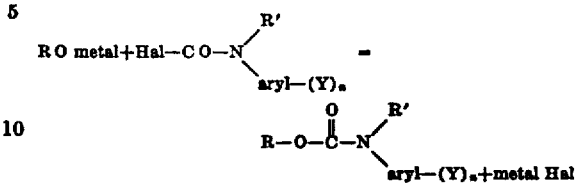

The radicals have the same significance as in Formula A.

The proportion of the reagents employed may vary within wide limits depending on whether the free phenol is utilized or the metal salt, or an agent to bind the hydrogen chloride formed during the reaction. Where the free phenol is employed, it is preferred to employ one mol of the carbamyl chloride to about two mols of the phenolic base. Where an acid binding agent is employed, or the metal phenolate, the ratio may be approximately one mol of a carbamyl chloride to one mol of the phenol. However, it is not necessary to adhere to these proportions since it is to be understood that the reagents may be employed in any suitable reacting proportions.

The substituted-aryl carbamyl chlorides employed as intermediates for the preparation of the esters are readily prepared by reacting phosgene and the corresponding substituted-aryl secondary amines. This reaction is preferably carried out in the presence of a compound capable of combining with the hydrogen chloride formed during the reaction. As examples of such compounds there may be mentioned sodium hydroxide, potassium hydroxide, pyridine and the like. The halogen-substituted aryl alkyl carbamyl chlorides can be obtained by halogenating the parent chloride.

While the substituted-aryl alkyl carbamic esters of phenolic bases are obtained in the form of tertiary amines, it is preferable to convert the base into a salt as, for example, the hydrochloride, methyl sulfate, toluene-sulfonate, methiodide or methyl bromide quaternary salts. This can be readily performed by treating the base with hydrogen chloride, methyl iodide, dimethyl sulfate, methyl bromide or p-tolusulfonate and similar quaternizing reagents.

The following examples will serve to illustrate some of the preferred methods for carrying out the invention.

EXAMPLE 1

3-(p-tolyl-methyl carbamoxy)phenyl-trimethyl-ammonium bromide

A solution of 50 grams of N-methyl-p-toluidine and 32.6 grams of pyridine in 200 cc. of xylene was added dropwise to 220 cc. of a 20% solution of phosgene in xylene kept at −10° C. After filtration and distillation of the xylene in vacuo, a crystalline residue remained. After recrystallization from petroleum ether (B. P. 60–70° C.), N-methyl-p-tolyl carbamyl chloride was obtained which had an M. P. 68–71° C. To a solution of 13.7 grams of N-dimethylamino phenol in 113 cc. of 0.9 mol of alcoholic potassium hydroxide 18.4 grams of the N-methyl-p-tolyl carbamyl chloride were added and the mixture refluxed for one hour. The potassium chloride formed was removed by filtration and the filtrate evaporated in vacuo. The residue was dissolved in ether and washed with dilute sodium hydroxide. After drying and removal of the ether by distillation, there was obtained by distillation at 165–170° C. and 0.15 mm. pressure 3-(p-tolyl-methylcarbamoxy)phenyl-dimethylamine. After standing several days in an acetone solution of methyl bromide, on addition of anhydrous ether 3-(p-tolyl-methylcarbamoxy)phenyl-trimethylammonium bromide crystallized. This product was recrystallized from a mixture of ethanol and ether. M. P. 153–154° C. decomposition.

EXAMPLE 2

3-(m-tolyl-methylcarbamoxy)phenyl-trimethyl-ammonium bromide

The procedure was the same as in Example 1 except that in place of the N-methyl-p-toluidine there was employed the N-methyl-m-toluidine. On reacting this amine with phosgene there was obtained N-methyl-3-tolyl carbamyl chloride with an M. P. of 53° C. When the latter compound was reacted with m-dimethylamino phenol, there was obtained 3-(m-tolyl-methylcarbamoxy)phenyl-dimethylamine, B. P. 191–196° C. at 0.13 mm. pressure. When the last-mentioned compound was combined with methyl bromide there was obtained 3-(m-tolyl-methyl-carbamoxy)phenyl-trimethylammonium bromide, M. P. 150° C. decomposition.

EXAMPLE 3

3-(o-tolyl-methylcarbamoxy)phenyl-trimethyl-ammonium bromide

The series of reactions employed to obtain the above-mentioned compound was the same as in Example 1 except that for the N-methyl-p-toluidine there was employed the N-methyl-o-toluidine. There was obtained N-methyl-2-tolyl carbamyl chloride, M. P. 63–65°; 3-(o-tolyl-methylcarbamoxy)phenyl-dimethylamine, B. P. 160–166° C. at 0.15 mm.; and the above salt, M. P. 154–5° C. decomposition.

By following the same series of reactions but starting off with p-methoxy methylaniline there was obtained the 3-(p-methoxyphenyl methylcarbamoxy)phenyl-trimethylammonium bromide.

EXAMPLE 4

3-(p-chlorphenyl-methylcarbamoxy)phenyl-trimethylammonium bromide

N-methyl-p-chlorphenylcarbamyl chloride (M. P. 59–63° C.) was prepared in a manner similar to N-methyl-p-tolyl carbamylchloride by reacting p-chlormethylaniline with phosgene. On esterification of the N-methyl-p-chlorphenylcarbamyl chloride with m-dimethylaminophenol, there was obtained 3 - (p - chlorphenyl-methylcarbamoxy-phenyl-dimethylamine, B. P. 191–196° C. at 0.5 mm. The quaternary salt was obtained by treating the amine with methyl bromide and was crystallized from a mixture of ethanol and ether. Its M. P. was 151–153° C. decomposition.

In a similar manner there was obtained the 3-ortho- and metachlorphenyl-methylcarbamoxy phenyl trimethylammonium bromides, M. P. 161–163° C. decomposition and M. P. 149–150° C. decomposition, respectively. The procedure for obtaining these compounds involved the substitution of o-chloromethyl-aniline and m-chloromethylaniline for the p-chloromethylaniline.

The following intermediates were formed: N-methyl-o-chlorophenyl-carbamyl chloride (M. P. 50–52° C.), N-methyl-m-chlorphenylcarbamyl chloride (M. P. 83–85° C.), 3-(o-chlorophenyl-methylcarbamoxy)phenyl-dimethylamine (B. P. 206–211° C. at 2 mm.), and 3-(m-chlorophenyl-methylcarbamoxy)phenyl-dimethylamine, (B. P. 195–200° at 1 mm.).

EXAMPLE 5

3-(N - methyl-2',3'-dimethylphenyl carbamoxy)-phenyl-trimethylammonium bromide The procedure in obtaining this compound was similar to that of Example 1. 1-methylamino-2,3-xylene was converted with phosgene to 1-N-methyl-2,3-xylidyl carbamyl chloride, M. P. 40–41° C. On esterification of this compound with m-dimethylamino phenol, there was obtained 3-(N-methyl-2',3'-dimethylphenyl carbamoxy)-phenyl-dimethylamine which had a B. P. of 200–205° C. at 0.9 mm. pressure. This compound could be crystallized from 75% ethanol and was found to have an M. P. of 106–107° C. By quaternizing with methyl bromide and recrystallizing from a mixture of acetone and ether, 3-(N-methyl-2',3'-dimethylphenyl carbamoxy)phenyl-trimethylammonium bromide was obtained with an M. P. of 165–166° C. decomposition.

In a similar manner, starting from 1-methylamino-2,4-xylene there was obtained 3-(N-methyl 2',4'-dimethylphenyl carbamoxy)phenyl-trimethyl-ammonium bromide, starting from 1-methylamino-3,4-xylene there was obtained 3-(N - methyl - 3',4' - dimethylphenylcarbamoxy) phenyl-trimethylammonium bromide. (M. P. 156–7° decomposition). The intermediate N-methyl, N-3,4-dimethylphenyl carbamyl chloride had an M. P. of 61–63° C. and the corresponding 3-(N-methyl - 3',4' - dimethylphenylcarbamoxy)phenyl-dimethylamine a B. P. of 187–195° C. at 0.45 mm.

EXAMPLE 6

3-(methyl-2,4-dibromophenyl carbamoxy)phenyl trimethylammonium bromide

A solution of 80 grams of 2,4-dibromo-N-methylaniline and 24 grams of pyridine in 400 cc. of xylene was added slowly to 300 cc. of a 20% solution of phosgene in xylene at −10° to 0° C. After filtration and vacuum distillation of the solvent, methyl-2,4-dibromophenyl carbamyl-chloride was obtained. It could be recrystallized from petroleum ether (B. P. 60–70°), M. P. 79–81° C. A solution of 13.7 grams of m-dimethylamino phenol in 93.5 cc. of 1.07 N sodium ethoxide in alcohol and 32.8 grams of methyl-2,4-dibromophenylcarbamyl chloride was refluxed for 1 hour. Sodium chloride was removed by filtration and the solvent removed by distillation in vacuo. The residue was taken up in ether and washed with a dilute solution of sodium hydroxide. After drying and removal of ether, the residue was distilled to remove a small fraction boiling at 135–145°. The residue was dissolved in a solution of methyl bromide in acetone. After several days, ether was added to give a crystalline precipitate of 3-(methyl-2,4-dibromophenyl carbamoxy)phenyl-trimethylammonium bromide. It could be recrystallized from a mixture of alcohol and ether. M. P. 154–5° C.

EXAMPLE 7

2-(methyl-p-tolyl-carbamoxy)-5-phenylbenzyl trimethylammonium bromide

To a solution of 22.7 grams of 3-dimethyl-aminomethyl-4-hydroxydiphenyl in 93.5 cc. of 1.07 N sodium ethoxide in alcohol, are added 18.4 grams of p-tolylmethylcarbamyl chloride and refluxed for 1 hour. Sodium chloride was filtered off and the alcohol removed by distillation in vacuo. An ether solution of the residue was washed with dilute sodium hydroxide. After drying and distillation of the ether, the residue was distilled in high vacuum to remove a small amount of material boiling up to 160° at 0.3 mm. The residue (B. P. above 260°/0.3 mm.) was then allowed to stand in an acetone solution of methyl bromide to give 2-(methyl-p-tolylcarbamoxy)-5-phenylbenzyl - trimethyl - ammonium bromide. M. P. 206–207.5° C.

Following the procedure of the above examples there can also be obtained compounds in which the Y substituents may be mixed as, for example, 3-(N-methyl 2'-chloro-3' - methylphenyl) carbamoxy-phenyl - trimethylammonium bromide, by starting off with the 2-chloro-3-methyl N-methylaniline. Likewise, there may be obtained the 3-(N - methyl - 2' - chloro,4' - methylphenyl carbamoxy) phenyl-trimethylammonium bromide by starting off with 2-chloro-4-methyl N-methylaniline. The trihalogen-substituted phenyl alkyl carbamyl chlorides are readily obtainable from the trihalogenated alkylanilines or by halogenation of the known phenyl alkyl carbamyl chlorides, while the dihalogen tolu'dines also form convenient starting materials. By the same procedure as herein described, these can be converted into the corresponding carbamic esters.

While most of the examples illustrate the invention in terms of dimethylaminophenols as the esterifying agent, it will be obvious that the other basic phenols may be employed; for instance, one may employ as the esterifying agent o-hydroxy benzyldiethylamine, m-diethylamino phenol, hydroxyquinoline and the like.

While the compounds of the invention have also been illustrated in the above examples in the form of their methyl bromide quaternary salts, it is also to be understood that any other suitable quaternizing or salt-forming agents may be employed such as the methiodide, p-toluenesulfonate, methyl sulfate and the like.

The method for preparing the esters has been illustrated in terms of reacting the substituted-aryl carbamyl halides with the free basic phenol or the basic metal phenolates, but the esters can also be prepared by other methods such as de described in my U. S. Patent No. 1,905,990. For instance, the phenol can be converted to its chlorocarbonic ester and this reacted with the appropriate amine, for example, N-methyl-p-toluidine in the case of preparing the p-tolyl-methyl carbamic esters.

The compounds in formula A where R is substituted by an aryl, aryloxy, or is a polycarbocyclic group, form the subject matter of application Serial No. 679,265, filed June 25, 1946.

I claim:

1. Carbamic esters of phenols containing a tertiary amino group and a substituted aryl group, said compound having the following formula:

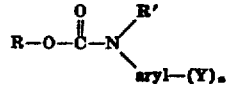

R being a member of the group consisting of a phenyl radical with a dialkyl amino group, a phenyl radical with a dialkyl amino alkyl group, and a benzoheterocyclic radical, R' being a member of the group consisting of a lower alkyl, aralkyl and aryl radical, Y being a member of the group consisting of a halogen, a lower alkyl and an alkoxy radical, n being a small whole number from 1 to 5, and Y being the same or different when n is more than one, and the quaternary salts thereof.

2. A composition as claimed in claim 1 in which the substituted-aryl is a halogenated aryl.

3. A compound as in claim 1 in which the substituted-aryl is an alkylated aryl.

4. A compound as in claim 1 in which the substituted-aryl is chlorophenyl.

5. A compound as in claim 1 in which the substituted-aryl is methylphenyl.

6. A compound as in claim 1 in which the substituted aryl is xylenyl.

7. 3-(p - toyl - methylcarbamoxy)phenyl - trimethylammonium bromide.

8. 3 - (p - chlorophenyl - methylcarbamoxy) phenyl-trimethylammonium bromide.

9. 3 - (N - methyl - 2',3' - dimethylphenylcarbamoxy) phenyl-trimethylammonium bromide.

10. The method which comprises esterifying through the hydroxyl group a phenol containing a basic substituent selected from the group consisting of dialkyl amino radicals, dialkyl amino alkyl radicals and a benzoheterocyclic radical with a carbamyl halide of the following formula:

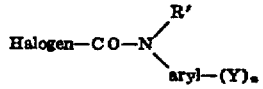

R' being a member of the group consisting of a lower alkyl, aralkyl, and aryl radical, Y being a member of the group consisting of a halogen, a lower alkyl and an alkoxy radical, n being a small whole number from 1 to 5, Y being the same or different when n is more than one, to form the corresponding substituted aryl carbamic ester of the said phenol.

11. The method which comprises reacting phosgene and a secondary amine of the following formula:

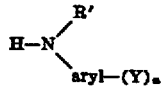

R' being a member of the group consisting of a lower alkyl, aralkyl, and aryl radical, Y being a a member of the group consisting of a halogen, a lower alkyl and an alkoxy radical, n being a small whole number from 1 to 5, Y being the same or different when n is more than one, and reacting the resulting carbamyl chloride with a phenol containing a basic substituent selected from the group consistency of dialkyl amino radicals, dialkyl amino alkyl radicals and a benzoheterocyclic radical so as to form the corresponding substituted-aryl carbamic ester of the said phenol, the said phenol being esterified through the hydroxyl group.

JOHN A. AESCHLIMANN.

REFERENCES CITED

The following references are of record in the file of this patent:

UNITED STATES PATENTS

| Number | Name | Date |
|---|---|---|
| 1,256,293 | Callsen | Feb. 12, 1918 |
| 1,905,990 | Aeschlimann I | Apr. 25, 1933 |
| 2,208,485 | Aeschlimann II | July 16, 1940 |

OTHER REFERENCES

Stolle, "Chem. Abstracts," vol. 22 (1928), pg. 422.

Stevens et al., "Jour. Am. Chem. Soc.," vol. 63 (1941), pp. 308-311.

Franchimont et al., "Recuile des travaux chim. des Pays-Bas," vol. 13, pg. 333.

Certificate of Correction

Patent No. 2,449,440.  September 14, 1948.

JOHN A. AESCHLIMANN

It is hereby certified that errors appear in the printed specification of the above numbered patent requiring correction as follows:

Column 4, line 17, for "chlorophenyl" read *chlorphenyl*; column 6, line 22, claim 2, for "composition" read *compound*; line 32, claim 7, for "p-toyl" read *p-tolyl*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.* stituted-aryl carbamic ester of the said phenol, the said phenol being esterified through the hydroxyl group.

JOHN A. AESCHLIMANN.

REFERENCES CITED

The following references are of record in the file of this patent:

UNITED STATES PATENTS

| Number | Name | Date |
|---|---|---|
| 1,256,293 | Callsen | Feb. 12, 1918 |
| 1,905,990 | Aeschlimann I | Apr. 25, 1933 |
| 2,208,485 | Aeschlimann II | July 16, 1940 |

OTHER REFERENCES

Stolle, "Chem. Abstracts," vol. 22 (1928), pg. 422.

Stevens et al., "Jour. Am. Chem. Soc.," vol. 63 (1941), pp. 308-311.

Franchimont et al., "Recuile des travaux chim. des Pays-Bas," vol. 13, pg. 333.

Certificate of Correction

Patent No. 2,449,440. September 14, 1948.

JOHN A. AESCHLIMANN

It is hereby certified that errors appear in the printed specification of the above numbered patent requiring correction as follows:

Column 4, line 17, for "chlorophenyl" read *chlorphenyl*; column 6, line 22, claim 2, for "composition" read *compound*; line 32, claim 7, for "p-toyl" read *p-tolyl*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*